May 18, 1965   H. J. BUTLER   3,184,004
DISC BRAKES
Filed July 26, 1961   5 Sheets-Sheet 1
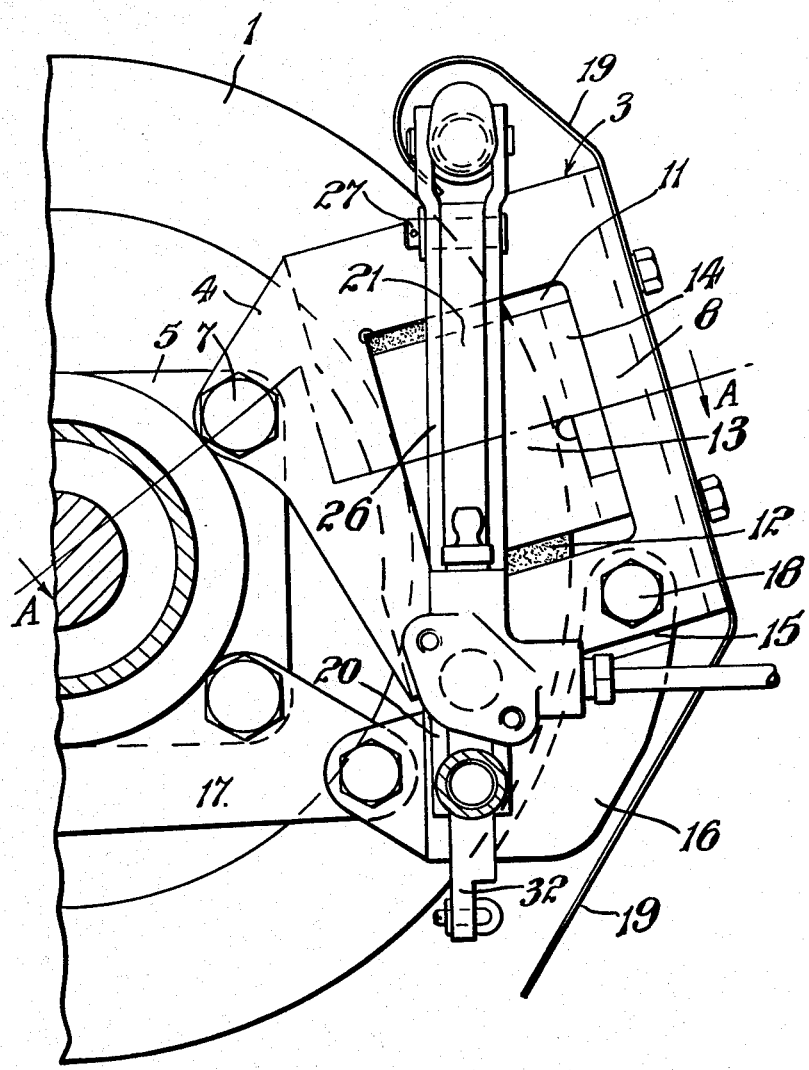
Fig. I
Inventor:
Henry James Butler
by Benj. T. Rauber
attorney

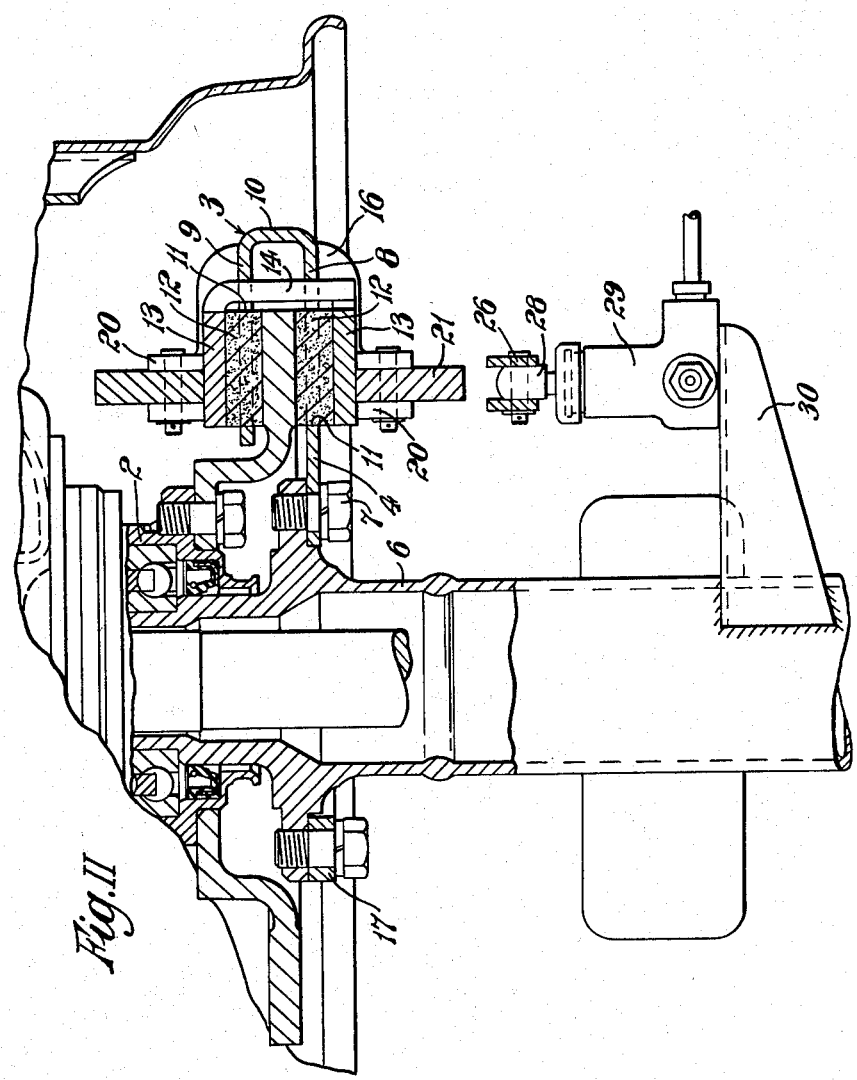

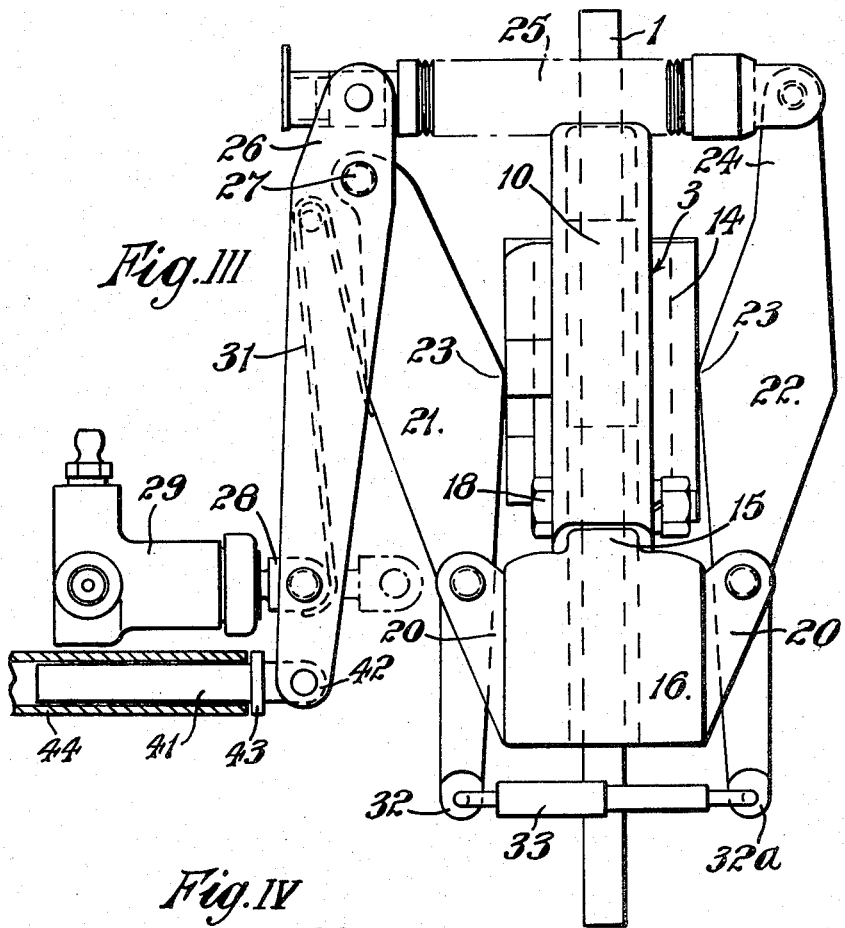
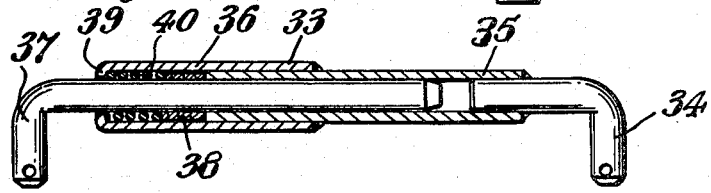

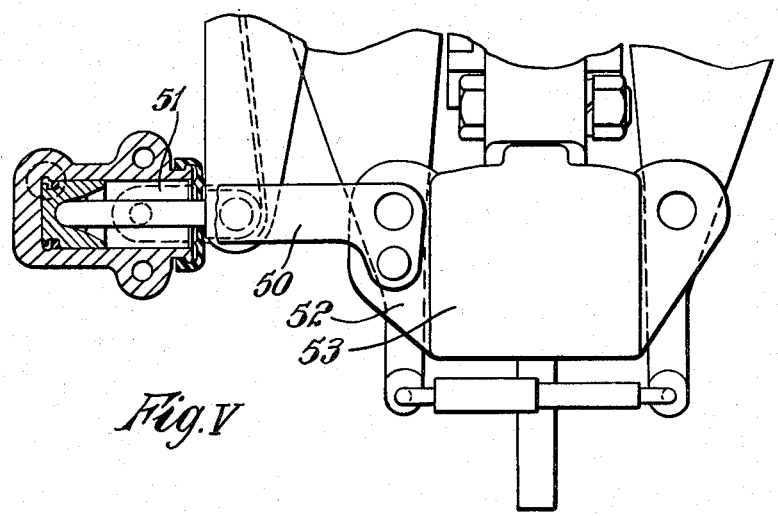
Fig. V
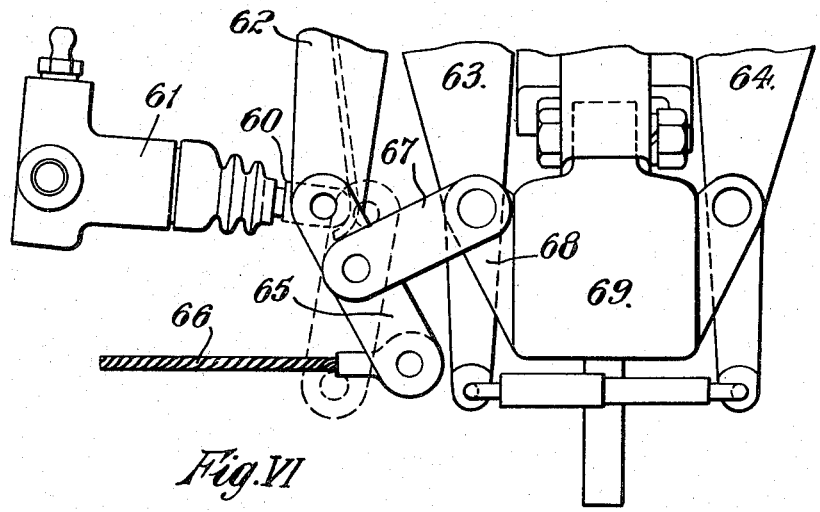
Fig. VI

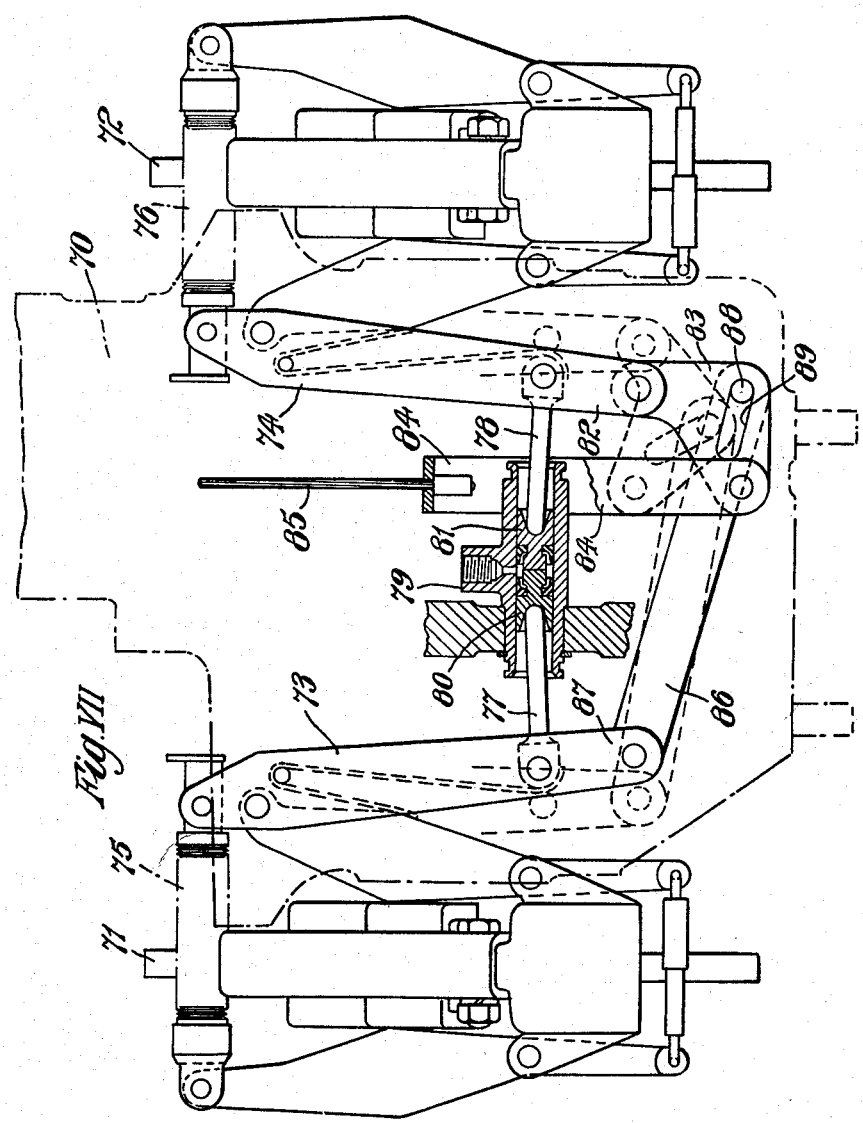

United States Patent Office 3,184,004
Patented May 18, 1965

3,184,004
DISC BRAKES
Henry James Butler, Sutton Coldfield, England, assignor to Dunlop Rubber Company Limited, London County, England, a British company
Filed July 26, 1961, Ser. No. 126,932
Claims priority, application Great Britain, July 27, 1960, 26,105/60
16 Claims. (Cl. 188—73)

This invention relates to disc brakes and is an improvement in or modification of the disc brake described in British Patent No. 709,305.

In the above patent specification we have described and claimed a disc brake assembly comprising an annular disc rotatable by a vehicle wheel, non-rotatable friction pad guide plates located adjacent each radially-extending side of the disc and provided with axially-extending holes therethrough, pads of friction material slidably-located in said holes to frictionally-engage said disc, means to force said pads into frictional engagement with said disc and a fluid pressure operated mechanism associated with said means and located remote from said friction pads for effecting said engagement. A trough-sectioned pressure member is laid tangentially across the pads on the same side of the disc. Lever members axially-aligned on each side of the disc, extend chordally across the disc and project beyond the periphery of the disc and one pair of ends are pivotally linked together adjacent the periphery of the disc. The lever members are pivotally associated, intermediate their ends, to the pressure members and associated with the pair of ends remote from the pivoting end is a brake-operating mechanism comprising a piston and cylinder having an operating rod extending between said ends adjacent the periphery of the disc, the arrangement being such that operation of the piston and cylinder mechanism forces the lever members towards the disc, in turn forcing the friction pads into frictional engagement with the disc.

The object of the present invention is to provide an improved and simplified brake of the kind described above and in more detail in said British Patent No. 709,305.

According to the present invention a disc brake comprises a rotatable annular disc, a torque sustaining member having non-rotatable guide plate members comprising axially-aligned friction pad guide plates located one adjacent each radially-extending side of the disc and provided with axially-extending guide passages therethrough aligned with said radially-extending sides, friction elements slidably-located within said guide passages and means to effect engagement of said friction elements with said disc comprising beam members axially-aligned on each side of the disc extending chordally or substantially chordally across said disc and pivotally secured to non-rotatable parts of said brake and an actuating member extending axially-adjacent the periphery of said disc secured at one end to an end of one of said beam members projecting beyond the periphery of said disc and pivotally-secured at the other end to one end of an operating lever pivotally secured intermediate its ends to an associated end of the other beam member and means to angularly-move said lever towards said disc so that said beam members are pivoted towards said disc to effect frictional engagement of said friction elements with said disc.

A force applying member to move said lever angularly towards the disc to effect a corresponding movement in said beam members may, for example, conveniently comprise a suitable fluid pressure operated mechanism associated with the free end of the lever remote from the end secured to the actuating member. Alternatively, the lever can be operated by a suitable mechanical device such as a cable or by a mechanical and fluid pressure device together.

The beam members extending chordally across said disc in one embodiment of my invention are pivotally secured to a caliper-type member which is secured to a non-rotatable part of the vehicle wheel or shaft assembly and which straddles the periphery of the disc. The friction element guide plates are axially-aligned and are united adjacent the outer periphery of the disc to form a non-rotatable guide plate member which can be pivotally secured to the caliper adjacent the periphery of the disc and detachably bolted to a non-rotatable part of the wheel or shaft assembly so that easy detachment of the guide plate member is afforded. Such a construction of guide plates and caliper portions is more fully described in my co-pending application Serial No. 92,864, filed March 2, 1961, now abandoned.

Alternative forms of the invention will now be described by way of example in the following description and these are shown in the accompanying drawings wherein:

FIGURE I shows a brake disc and disc brake assembly constructed in accordance with the invention, FIGURE II is a section along the line A—A of FIGURE I, FIGURE III is an end view of the brake assembly, FIGURE IV shows in more detail the tubular telescopic member illustrated in FIGURE III, FIGURE V shows an alternative method of mounting a fluid pressure brake actuating mechanism, FIGURE VI shows a further alternative form of means for operating the disc brake, and FIGURE VII shows two inboard disc brakes and means for their operation.

As shown in FIGURES I, II and III a disc brake assembly comprises a rotatable disc 1 secured to a rotatable hub 2 of a wheel assembly and is provided with a non-rotatable guide plate member 3 in a form of a U-shaped member straddling the periphery of the disc with one limb 4 of the U-shaped member bolted to a non-rotatable plate 5 on an axle housing 6 by means of a bolt 7 and a spring washer. The two limbs of the non-rotatable guide plate member 3 form a pair of axially-aligned guide plates 8 and 9 parallel to and adjacent the braking faces of the disc and united adjacent the outer periphery of the disc by bridge piece 10.

Each guide plate 8, 9 is provided with a rectangular aperture 11, the radially-inner two-thirds of which is aligned with the braking surface of the disc 1. A substantially rectangular pad 12 of friction material is slidable in each aperture 11 and each pad 12 is provided with backing plate 13, a portion 14 of which extends axially adjacent the periphery of the disc and slidably engages a similar portion of the opposite backing plate to prevent tilting of the pad relative to the guide plate member 3. Such a pad construction is more fully described in my co-pending application Serial No. 92,921, filed March 2, 1960, now Patent No. 3,124,217.

The guide plate member 3 is pivotally attached, adjacent the periphery of the disc 1, to a tongue 15 extending circumferentially adjacent said periphery from the jaw portion of a caliper-type member 16 which straddles said periphery and which is bolted on one side of the disc to the non-rotatable plate 5 through an arcuate plate 17. The guide plate member 3 is pivotally attached to the caliper-type member 16 by means of bolt 18 so that if bolt 7 securing the guide plate member to the plate 5 is removed, the member can pivot about the bolt 18 outwardly of the disc, or if desired, removal of the members completely can be effected by removing bolt 18 also. Thus the pads 12 of friction material can be slid axially from the guide plate members to facilitate easy replacement. A disc brake having such a construction is more fully described in the above mentioned co-pending application Serial No. 92,864.

A dust cover 19 is secured to the bridge portion 10 of the guide plate member 3 as shown in FIGURE I but this is not shown in FIGURES II and III. This dust cover or thin metal shield reduces fouling of the brake by road dirt, mud and stones.

The caliper-type member 16 is provided, on each side of the disc 1, with a slotted lug 20, within each of which is pivotally secured a beam 21, 22 which extends chordally across the disc. The axially-inner part of each beam 21, 22 is provided, between the ends, with a projecting portion 23 arranged to contact the centre of pressure of the pad backing plate 13. One beam 22 is longer than the other and projects beyond the periphery of the disc 1 and pivotally secured to the projecting end 24 is a link 25 which extends axially adjacent the periphery of the disc and is pivotally secured on the other side of the disc to one end of a bifurcated lever 26 which partially nests over the beam 21 on said other side of the disc and is pivotally secured thereto adjacent the associated end of the beam 26 by means of pin 27. The arrangement is such that angular movement of the lever 26 towards the disc forces both beams 21 and 22 towards the disc to apply the brake. Pivotally secured to the lever 26 adjacent the end remote from the operating rod 25 is a piston extension 28 of a cylinder 29 of a brake-actuating mechanism which is supported on the axle housing 6 by plate 30. A hair spring 31 positioned between the piston extension 28 and the beam 21 returns the lever 26 to its inoperative position when the brake is released.

The operating rod 25 is pivotally secured at its end to the beams 21 and 22 and comprises a reversible-thread adjusting device.

The beams 21 and 22 project outwardly of the lugs 20 beyond the periphery of the disc 1 and the projecting ends 32 and 32a are connected together by a tubular telescopic member 33 comprising a helically-wound interference bush. The construction of the tubular telescopic member 33 is more fully shown in FIGURE IV. It comprises a rod 34 which is pivotally secured to the end 32a of beam 22 and is welded or otherwise secured to a tube 35, the other end of which is welded or otherwise secured in a further tube 36. Slidably mounted within said tube 35 is a second rod 37 which is pivotally secured to the end 32 of beam 21. A helically-wound interference member 38 frictionally engages the surface of rod 37 and is positioned within the tube 36 and between this interference member 38 and the end 39 of tube 36 is a helically wound compression spring 40 so that as the beams 21 and 22 pivot towards the disc 1 the rods 34 and 37 move axially outwardly of each other and the spring 40 is compressed. When the brakes are released the rods 34 and 37 return to their original position. If wear of the friction pads has taken place the outward axial movement will be greater than normal and the spring 40 will be compressed to the fullest extent possible. Further axial movement of the rods 34 and 37 beyond this position causes the interference member 38 to slip along the rod 37 until the brakes are fully applied and when these are released, the interference member 38 will grip the rod 37 firmly in its new position. The separation between the ends of the rods 37 and 34 will thus be greater than before and the beams 21 and 22 nearer the disc. Automatic adjustment of the position of the beams 21 and 22 therefore takes place when wear of the pads occurs.

The lever 26 is also provided with means for mechanical operation of the brake and this comprises a spigot 41 pivotally secured to the end 42 of the lever 26 remote from that secured to the operating rod 25. The spigot 41 is provided with an annular abutment or step 43 and is slidably mounted in a tube 44 adapted to be moved axially with respect to the disc 1. The tube 44 is connected by suitable means to an operating lever under the control of the driver of the vehicle, such as a handbrake, and when the tube 44 is moved axially towards the disc 1 the spigot 41 is also moved in this direction to pivot the lever 26 towards the disc and operate the brake.

An alternative mounting for the fluid pressure brake actuating mechanism is shown in FIGURE V. Two arms 50 and 51 are secured to the slotted lug 52 of the caliper-type member 53. One of the arms 50 (shown in part) is secured to one substantially flat surface of the lug 52 while the other arm 51 is secured to the other surface of the lug and each arm is secured to opposing sides of the cylinder of the brake-actuating mechanism. In this construction a mounting for the cylinder on the axle housing is not required.

An alternative form of operating means for a disc brake in accordance with the invention is shown in FIGURE VI. In this, the piston extension 60 of the cylinder 61 of the brake-actuating mechanism is pivotally secured to the end of the bifurcated lever 62. Pivotally secured also to the end 62 is a further lever 65 at the other end of which is secured a handbrake cable 66. A lever 67 is pivotally mounted at one end on lever 65 intermediate its ends and the lever 67 is pivotally mounted at its other end on the slotted lug 68 of the caliper-type member 69. Forward axial movement of the piston extension 60 towards the disc moves the lever 62 and consequently the beams 63 and 64 towards the disc to effect braking. Operation of the brake in a mechanical manner is effected by moving the cable 66 axially outwardly with respect to the disc and this pivots the lever 65 about the lever 67 to a position as shown by the dotted lines to effect similar movement in lever 62 and beams 63 and 64 to effect braking.

An inboard disc braking system for a motor-vehicle is shown in FIGURE VII in which a disc brake substantially as shown in FIGURES I, II and III is positioned one on each side of a differential unit 70. The discs 71 and 72 are secured to the respective axle half-shafts and the bifurcated levers 73 and 74 pivotally secured at one end respectively of operating rods 75 and 76. Opposite piston extensions 77 and 78 of a twin cylinder unit 79 of a brake-actuating mechanism are pivotally secured respectively to levers 73 and 74 intermediate their ends so that operation of the cylinder unit 79 causes the pistons 80 and 81 to move said extensions 77 and 78 outwardly to pivot said levers 73 and 74 and apply the brakes in a similar manner to that described before.

Pivotally secured to the end 82 of lever 74 is one apex of a substantially triangular plate 83. The plate 83 is pivotally secured at another apex to one end of a lever 84, the other end of which is attached by suitable means to a handbrake cable 85. A further lever 86 is pivotally secured at one end to the end 87 of lever 73 and at its other end is provided with a spigot 88 slidable in a slot 89 in the plate 83 adjacent the third apex thereof.

When the cylinder unit 79 is operated the levers 73 and 74 are moved towards the respective discs with the lever 86 able to move in relation to the plate 83 by the spigot sliding in the slot 89. If it is desired to operate the brakes by mechanical means, then the cable 85 is tensioned so as to rotate the plate 83 about the spigot 88 and the end 82 of the lever 74. Consequently, the bifurcated levers 73 and 74 are moved angularly inwardly towards the respective disc to apply the brakes. The position of the operating mechanism when mechanically operated is shown by the dotted lines.

The disc brakes according to the invention can be easily and conveniently assembled for both fluid pressure and mechanical operation as shown and described above.

The brake may be re-set, when fitting a replacement friction element, by unscrewing the reversible thread device. This will pivot the beams and thereby re-set the interference bush device.

Having now described my invention, what I claim is:

1. A disc brake comprising a rotatable disc, a pair of friction elements one on each side of said disc adjacent to a segment of the adjacent braking surface of said disc, a non-rotatable element adjacent to said disc, a pair of beam members disposed one on each side of said disc alongside a chord of said disc, each beam member being pivotally secured to said non-rotatable element and having a fulcrum engagement with the adjacent friction element to move its respective friction element to frictional engagement with a braking surface of said disc, a lever fulcrumed intermediate its ends on one of said beam members at a locus on said beam spaced from its pivotal mounting on said non-rotatable element, said lever extending beyond said locus, a link beyond the periphery of said disc connecting said lever beyond its fulcrum with the free end of said beam member on the other side of said disc, and a force applying means engaging said lever to tilt said lever in a direction to draw said beams toward each other and apply a brake applying force to said friction elements at the fulcrum of said beam elements.

2. The disc brake of claim 1 in which said lever is attached to said first mentioned beam at the end of said beam.

3. The disc brake of claim 1 in which said second mentioned beam and said lever extend beyond the periphery of said disc and in which said link comprises a rod connecting said end of said lever to the end of said beam.

4. The disc brake of claim 1 in which said force applying means engages said lever adjacent said pivotal mounting of said beam members on said non-rotatable element.

5. A disc brake according to claim 1 in which said force applying means comprises a spigot pivotally secured to the end of the operating lever remote from that secured to said actuating member and provided with a radial abutment and a tube in which said spigot is slidable and which is movable axially with respect to said disc so that axial movement of said tube towards said disc causes said tube to abut said abutment and move said spigot towards said disc and angularly move said operating lever and said beam members towards said disc to effect frictional engagement of said pads with said disc.

6. The disc brake of claim 1 in which said force applying means comprises a piston and cylinder.

7. The disc brake of claim 1 in which said force applying means is manual.

8. The disc brake of claim 1 comprising a first member pivotally connected at one end to the end of said lever, a handbrake cable connected to said first member at a point spaced from said end, a fixed support, and a second member pivoted on said fixed support and pivotally connected to said first member between said end and said connection to said handbrake cable, so that force applied from said cable is transmitted to said end of said lever.

9. A disc brake comprising a rotatable disc, a non-rotatable torque-sustaining member having a pair of guide plates, one on each side of said disc, each plate having a guide passage for fraction elements axially aligned with the guide passage of the opposite plate, friction elements one in each guide passage movable therein to and from frictional engagement with the adjacent surface of said disc, and means to move said friction elements into frictional engagement with the adjacent surface of said disc, said means comprising beam members one on each side of said disc alongside a chord of said disc and traversing said guide passages, each beam member being adapted to abut an adjacent friction element, a non-rotatable element on which the beam members on opposite sides of the disc are pivotally mounted at one end, a lever fulcrumed intermediate its ends on the end of one of said beam members remote from the non-rotatable element, one end of the lever member extending beyond the periphery of the disc, an actuating member connected to said end of the lever member and extending beyond the periphery of the disc to engage the second beam member at the end remote from the non-rotatable element, and a force applying means engaging the lever member adjacent its other end to tilt said lever about its fulcrum and thus move the beam members together with the friction elements towards the adjacent surfaces of the disc.

10. The disc brake of claim 9 which comprises a fixed, non-rotatable, support for one of said guide plates on which said guide plate is detachably secured and in which said detachably secured guide plate is united adjacent the periphery of the wheel with the guide plate on the other side of the disc.

11. The disc brake of claim 10 comprising a fixed, non-rotatable caliper straddling said disc at one end of said rotatable caliper straddling said disc at one end of said torque sustaining member and means to mount said torque sustaining member pivotally on said caliper to enable said torque sustaining member to swing radially outwardly from said disc.

12. The disc brake of claim 11 in which the pivotally supported ends of said beam members are mounted on said caliper.

13. The disc brake of claim 12 in which said beam members extend past their pivotal mounting on said caliper and in which said disc brake comprises a connection between said extending ends said connection comprising means for limiting the return movement of said beam members from said disc as said friction elements wear.

14. The disc brake of claim 13 in which said means for limiting the return movement of said beam members comprises a pair of telescoping members one connected to one of said extending ends of said beams and the other connected to the extending end of the other beam, an interference element helically wound on and frictionally gripping one of said telescoping members and a spring mounted on said members in position to bias said extending ends toward each other to a limited distance and to cause said interference member to slide on its telescoping member when said spring is compressed to a limit and said telescoping members are extended beyond this limit.

15. A disc brake according to claim 14 wherein said tubular telescopic member comprises a tube pivotally secured to one of said beam members, an axially movable rod extending from said tube pivotally secured to the other of said beam members, a helically wound interference member frictionally engaging the surface of said rod and spring means abutting said interference member so that as said beams pivot towards said disc the tube and the rod move outwardly relative to one another, the interference member moving in unison with the rod to compress the spring means and upon further relative movement between said tube and said rod relative movement also takes place between said interference member and said rod.

16. The disc brake of claim 9 in which each said friction element comprises a friction pad and a backing plate extending transversely of the disc and beyond the periphery of the disc into the guide passage of the guide plate on the opposite side of said disc.

(References on following page)

References Cited by the Examiner

UNITED STATES PATENTS

| | | | |
|---|---|---|---|
| 2,527,072 | 10/50 | Pogue | 188—73 |
| 2,536,269 | 1/51 | Driscoll | 188—196 |
| 2,830,679 | 4/58 | Butler | 188—72 |
| 2,866,524 | 12/58 | Flesch | 188—73 |
| 2,867,295 | 1/59 | Butler | 188—73 |
| 2,907,412 | 10/59 | Butler | 188—73 |
| 2,984,319 | 5/61 | Butler | 188—73 |
| 3,051,272 | 8/62 | Burnett | 188—73 |
| 3,053,346 | 9/62 | Butler | 188—73 |

FOREIGN PATENTS

| | | |
|---|---|---|
| 580,862 | 7/33 | Germany. |
| 614,338 | 2/61 | Canada. |
| 709,305 | 5/54 | Great Britain. |
| 1,221,369 | 1/60 | France. |

ARTHUR L. LA POINT, *Primary Examiner.*

A. JOSEPH GOLDBERG, EUGENE G. BOTZ,
*Examiners.*